United States Patent [19]

Summerlin et al.

[11] Patent Number: 4,653,969
[45] Date of Patent: Mar. 31, 1987

[54] PIN AND SWAGED TUBULAR MEMBER TYPE OF FASTENER

[75] Inventors: Frederick A. Summerlin, St. Albans; Hugh K. McGauran, Harlow, both of England

[73] Assignee: Avdel Limited, Hertsfordshire, England

[21] Appl. No.: 746,660

[22] Filed: Jun. 20, 1985

[30] Foreign Application Priority Data

Jun. 25, 1984 [GB] United Kingdom ............... 8416183

[51] Int. Cl.[4] ............................................ F16B 19/00
[52] U.S. Cl. .................................................... 411/361
[58] Field of Search ............... 52/99; 411/34, 361; 72/104, 103; 29/413, 520

[56] References Cited

U.S. PATENT DOCUMENTS

| | | | |
|---|---|---|---|
| 2,060,087 | 11/1936 | Klamp | 72/103 |
| 2,531,048 | 11/1950 | Huck | 411/361 |
| 3,253,495 | 5/1966 | Orloff | 411/34 |
| 3,953,996 | 5/1976 | Chernock | 72/103 |
| 4,208,943 | 6/1980 | Smith | 411/361 |
| 4,233,878 | 11/1980 | McGauran | 411/361 |
| 4,342,529 | 8/1982 | Smith | 411/361 |
| 4,437,805 | 3/1984 | Smith | 411/361 |
| 4,519,736 | 5/1985 | Sigmund | 411/361 |
| 4,571,972 | 2/1986 | Greis et al. | 72/104 |

FOREIGN PATENT DOCUMENTS 794863 12/1935 France ................... 29/413

Primary Examiner—James L. Ridgill, Jr.
Attorney, Agent, or Firm—Oblon, Fisher, Spivak, McClelland & Maier

[57] ABSTRACT

A pin for a pin and swaged tubular member type of fastener has a shank (14) provided along nearly all of its length with identical combination locking, breakneck and pulling grooves (20). Each groove is provided on at least one sidewall with a discontinuity, and in a preferred embodiment both sidewalls of each groove are provided with discontinuity in the form of a displacement across the width of the groove and along the length of the pin. Alternatively the discontinuity may take the form of a change in inclination of the groove wall, or a combination of both such displacement and change in inclination.

7 Claims, 11 Drawing Figures

PIN AND SWAGED TUBULAR MEMBER TYPE OF FASTENER

BACKGROUND OF THE INVENTION

1. Field of the Invention

The invention relates to a pin and swaged tubular member type of fastener. Such fasteners are commonly used for securing together two or more workpieces, such as metal panels, having aligned holes through which the fastener is inserted.

There are two varieties of such fasteners. In the first variety, the pin has a radially enlarged head at one end, which head abuts one outside face of the workpieces, the pin shank extends through the holes and protrudes from the other outside face of the workpieces, and the tubular member is swaged on to the protruding part of the pin to abut that other face of the workpieces and lock the tubular member to the pin. Such fasteners are commonly known as lockbolts, and access to both sides of the workpieces is necessary to install the fastener.

The second variety of fastener requires access to only one side of the workpieces, and is therefore known as a blind fastener. In this variety of fastener the tubular member has an enlarged head at one end which head abuts the nearer outside face of the workpieces, with the tubular member extending through the aligned holes and protruding beyond the remote or blind outside face of the workpieces. The pin extends inside the tubular member and engages it at or near the end of the tubular member remote from the head thereof. Commonly (but not necessarily) the pin has an enlarged head which engages the tubular member. Such head is usually of a diameter no greater than that of the tubular member to facilitate the insertion through the aligned holes, and the filling thereof, by the tubular member. Instead of the pin having an enlarged head, the tubular member may be crimped into a groove in the pin. The pin is pulled to cause the remote end of the tubular member to enlarge radially and to form a blind head which abuts the remote or blind face of the workpieces. The head end of the tubular member is then swaged on to the pin, to lock the pin to the tubular member.

The present invention was developed primarily for application to the first variety of fastener, i.e. to lockbolts, and will hereinafter be described in detail in relation to lockbolts. However, it is equally applicable to blind fasteners of the second variety described above.

In order that the tubular member can be swaged to the pin, the pin is provided with a number of annular grooves (the locking grooves) into one or more of which the tubular member can be swaged by means of an annular anvil which engages the exterior of the tubular member, to lock the tubular member to the pin. Commonly an installation tool is employed in which the tail end of the pin extends through the annular anvil where it can be gripped by a gripping device (such as a set of jaws) incorporated in the tool, which also includes pulling means for pulling the gripping means against a reaction taken up through the anvil on to the tubular member.

In order that the gripping means can grip the pintail, the pintail is usually provided with a number of annular grooves (the pulling grooves) with which the gripping means can engage to pull the pin.

Since it is a practical requirement that, after completion of the swaging operation, the pin breaks at a position substantially level with the outside end of the swaged tubular member (the socalled "flush break" condition), the pin has commonly been provided with a breakneck, defined by an annular breakneck groove around it, and positioned, along the length of the pin, intermediate the locking grooves and the gripping grooves. The breakneck must be the weakest part of the pin, so that the breakneck groove must be deeper than any of the locking grooves and gripping grooves.

The provision of a single breakneck groove which must be aligned substantially level with the outside end of the swaged collar, in order to achieve a flush break, places severe limitations on the range of total thicknesses of workpieces (known as the "grip range") which identical fasteners of the same design can satifactorily join.

A grip range which is as large as possible is a very valuable practical advantage for such fasteners. Consequently there have from time to time been proposals to leave out the single breakneck groove and instead provide a number of combination grooves, each of which is capable of acting as either a locking groove or a breakneck groove, and which are arranged so that the pin will break at that one of those grooves which is substantially level with the outer end of the swaged tubular member. This provides a range of possible positions for the tubular member when it is swaged to the pin, but it has proved difficult in practice to ensure that pin-break occurs consistently at or near the outer end of the collar.

One proposed solution to this problem has been to apply a sideways or bending force to the pin tail after swaging is complete, but this requires the installation tool and/or fastener to be specially modified. Another solution proposed has been to provide combination locking-and-breakneck grooves which are of different cross-sectional shape at different positions along the pin. However this can be difficult to manufacture reliably, partially due to practical limitations of the rolling process by which such pins are commonly manufactured. Furthermore, there must be significant differences between each such groove and the next, for such a system to be effective. These differences are of course cumulative along successive grooves, and the distance apart of the limiting cases of cross-sectional shape of groove which will function properly as both locking groove or breaker groove is the limit of the increase in grip range.

It has also been found in practice that it is desirable to maintain the dimension of the diameter of the breakneck below a certain ratio to the dimension of the pitch of the grooves (i.e. the distance between adjacent breaknecks). With prior art forms of combination locking and breakneck grooves this has presented difficulties, since increase in the maximum depth of the grooves whilst keeping the pitch the same would result in a shape of groove cross-section which may reduce the effectiveness of the lock between swaged collar and the pin, thus weakening the tension strength of the joint produced.

These problems would be made even more difficult if it were desired to provide a single design of groove cross-section which could also act as a pulling groove, so that each groove is a combination locking, breaking and pulling groove.

SUMMARY OF THE INVENTION

The present invention is intended to overcome such problems as have been mentioned above, and it is believed that it does so in an entirely new way.

The present invention provides a pin and swaged tubular member type of fastener in which the tubular member is may to be swaged into one or more annular locking grooves on the pin, which pin comprises an elongate shank having a radially enlarged head at one end:

a plurality of the annular locking grooves extending along the length of the shank, at least some of which grooves comprise combination locking and breakneck grooves each of which is capable of acting as either a locking groove or a breakneck groove;

each of which annular combination locking and breakneck grooves comprises a radially inner part and a radially outer part;

the radially inner part of the groove comprising two sidewalls extending radially inwardly towards the bottom of the groove;

the radially outer part of the groove comprising two sidewalls spaced apart to define a space into which tubular member may be swaged;

there being a discontinuity between the radially outer edge of at least one of the sidewalls of the radially inner part and the radially inner edge of the adjacent sidewall of the radially outer part.

It may be that the discontinuity is provided by a displacement, in a direction across the width of the groove and along the length of the pin, between the radially outer edge of the sidewall of the radially inner part and the radially inner edge of the adjacent sidewall of the radially outer part.

It may be that the discontinuity is provided by a difference between the inclination of the sidewall of the radially inner part and the inclination of the adjacent sidewall of the radially outer part, at the junction between the two sidewalls.

It may be that the discontinuity is provided by both such a displacement and such a difference in inclination.

Preferably there is a discontinuity between the radially outer edge of each of the sidewalls of the radially inner part and the radially inner edge of the adjacent sidewall of each radially outer part, as aforesaid.

Preferably all of the plurality of locking grooves comprise combination locking and breakneck grooves as aforesaid.

Preferably the combination locking and breakneck grooves are provided over a zone which extends along the pin towards the end thereof which, in use is gripped and pulled, thereby also to provide pulling grooves by means of which the pin is intended to be gripped and pulled.

BRIEF DESCRIPTION OF THE DRAWINGS

A specific embodiment of the invention, and some modifications thereof, will now be described by way of example and with reference to the accompanying drawings, in which.

DETAILED DESCRIPTION OF THE PREFERRED EMBODIMENTS

Figure 1:
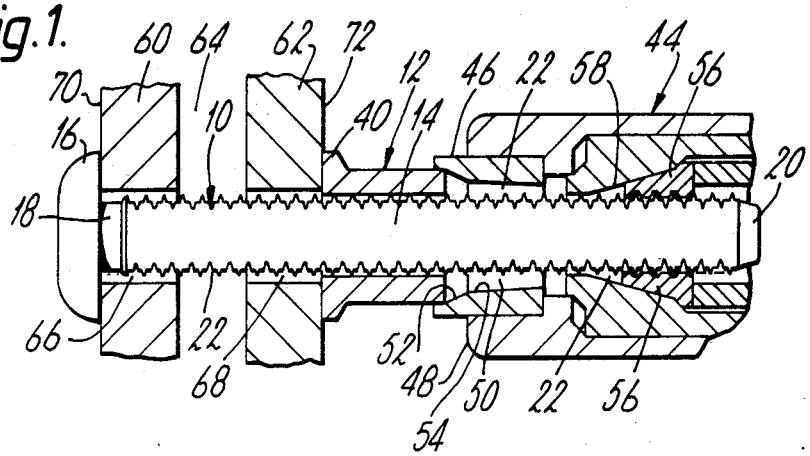
FIG. 1 is a partial longitudinal sectional view through a fastener incorporating a pin according to the invention, inserted through aligned holes in workpieces to be joined, and having an installation tool in initial engagement with the fastener.

In the example illustrated in FIGS. 1 to 6, the fastener is of the first variety referred to above, commonly known as a lockbolt. The fastener comprises a pin 10 together with a separate tubular member in the form of a collar 12, both made of steel. The pin 10 comprises an elongated shank 14, having a radially enlarged head 16 formed integrally therewith at one end. Apart from a short cylindrical section 18 immediately adjacent the head, and a short bevel or taper 20 at the remote free end of the shank (i.e. the tail end of the shank), the remainder of the length of the shank is formed with a plurality of substantially identical, annular, combination locking, breakneck and pulling grooves 22, the shape of which is shown in greater detail in FIGS. 2 and 3. These identical combination grooves thus extend over nearly all of the length of the pin shank.

Figure 2:
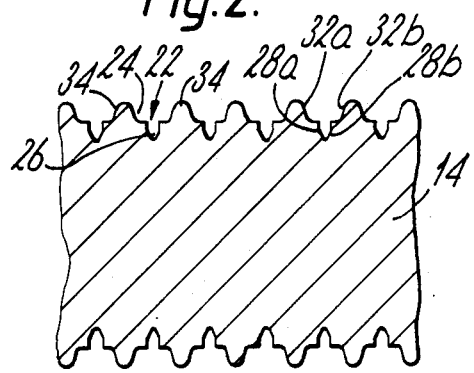
FIGS. 2 and 3 are fragmentary longitudinal sectional views, to enlarged scales, through the grooves of the pin of FIG. 1, illustrating the shape of the grooves.
Figure 3:
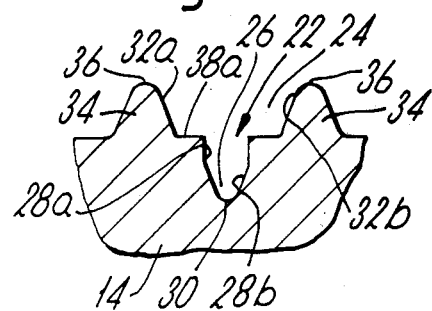

As is more clearly shown in FIGS. 2 and 3, which illustrate the cross-section of the grooves, each of the combination grooves 22 combines a radially outer part 24 and a radially inner part 26. The radially inner part 26 comprises two sidewalls 28a, 28b, on opposite sides of the grooves, which extends towards the bottom 30 of the groove. In this example the shape of the bottom 30 of the groove comprises an arc of a circle, the immediately adjacent parts of each sidewall forming a V-shape, these parts blending into further parts which are substantially parallel to each other and at right-angles to the length of the pin.

The radially outer part 24 of each groove comprises two sidewalls 32a, 32b spaced apart to define the space 24 into which the collar may be swaged, as will be described hereinafter. In this example the two sidewalls 32a, 32b are inclined at an angle to each other, the sidewalls 32a, 32b being substantially parallel, respectively, to the innermost parts of the sidewalls 28a, 28b which form a V-shape adjacent the groove bottom 30. Each sidewall 32a, 32b defines one side of one of the annular ribs 34, each of which separates the outer part of one combination groove 22 from the next adjacent groove. The shape of the crest 36 of each rib is an arc of a circle which blends between the two sidewalls.

There is a discontinuity between the radially outer edge of the sidewall 28a of the inner part of each groove and the radially inner edge of the adjacent sidewall 32a of the radially outer part. This discontinuity is in the form of a shoulder or step surface 38a which provides a displacement, in the direction across the width of the groove and along the length of the pin, so that the outer sidewall 32a is displaced from the inner sidewall 28a in the direction away from the opposed sidewall 28b, 32b. That other sidewall also has a similar discontinuity, in the form of a shoulder or step surface 38b, which displaces the outer sidewall 32b from the adjacent inner sidewall 28b in the direction across the width of the groove and away from the opposed sidewall 28a, 32a.

It will be apparent from FIGS. 2 and 3 that the cross-sectional shape of each groove has mirror-image symmetry about an imaginary plane at right angles to the length of the pin and passing through the bottom 30 of the groove. The two steps 38a, 38b are radially level with each other, and are at a radial position approxiamtely mid-way between the groove bottom 30 and the rib crest 36.

However, the cross-sectional shape of each groove, and the form of the discontinuity or discontinuities between the adjacent sidewall parts, may be different, as will be described later.

Reverting to FIG. 1, the fastener also comprises the previously mentioned collar 12. This is generally cylindrical in form, having an outwardly extending flange 40 at one end, to abut one of the workpiece faces. The collar is a clearance fit over the rib crests of the pin 10, and its axial length is sufficient to cover a number of adjacent grooves on the pin, in this example about six or seven grooves.

The pulling tool 44 used is of the usual type employed for placing lockbolts. It has an annular swaging anvil 46 extending forwardly from the nose portion 48 of the tool. The anvil 46 has a central frusto-conically shaped opening or throat 50, which opening has a first relatively steeply tapered portion 52 at its outer end, and a second less steeply tapered part 54 behind the part 52. The outer tapered part 52 is such that the external diameter of the cylindrical part of the collar 12 will just enter its wider end. The tool also comprises gripping and pulling means, provided by jaws 56 which are carried in a collet 58. The jaws have teeth of the appropriate form to engage in the outer parts 24 of the combination grooves 22 on the lockbolt pin. Actuation of the pulling tool will cause the jaws 56 to engage the grooves of a pin inserted between them, and to retract the pin rearwardly with respect to the anvil so as to exert a pulling or tension force on the pin.

The method of use of the fastener will now be described, with reference to FIGS. 1, 4, 5 and 6 of the drawings.

The lockbolt is used to secure together two metal panels 60, 62 which may initially have a gap 64 between them. Aligned holes 66, 68 are provided in the two panels, the holes being circular in cross-section and of a diameter which is a clearance fit on the pin shank 14 but is smaller than the diameter of the pin head 16 and the collar flange 40. The pin 14 is inserted from the back of the panels (i.e. the left-hand side as viewed in FIG. 1) until the pin head 16 abuts the adjacent back face 70 of the back panel 60, and the free end of the pin shank 14 protrudes from the front or near face 72 of the other panel 62. The collar 12 is placed over the pin shank and pushed along the pin until the collar flange 40 abuts the front panel face 72. The pulling tool 44 is offered up to the protruding pin shank so that the pin shank enters the anvil throat 50 and enters between the jaws 56. The tool is pushed forward until the anvil outer taper 52 contacts the outer end of the collar 12. The pulling tool 44 is then actuated so that initially the jaws 56 close together and grip the pin, with the jaw teeth entering the radially outer parts 24 of those of the combination grooves 22 on the pin which lie between the teeth. This is the position illustrated in FIG. 1.

Continued actuation of the tool causes the jaws to be retracted with respect to the anvil. Since the jaws are engaged in the pin grooves and the pin cannot move because of the engagement of its head 16 with the panel face 70, the anvil 46 is driven forwards, i.e. towards the left as shown in FIGS. 1, 4, 5 and 6. This pushes the front sheet 62 backwards, closing the gap 64, until the two sheets 60, 62 abut each other.

Figure 4:
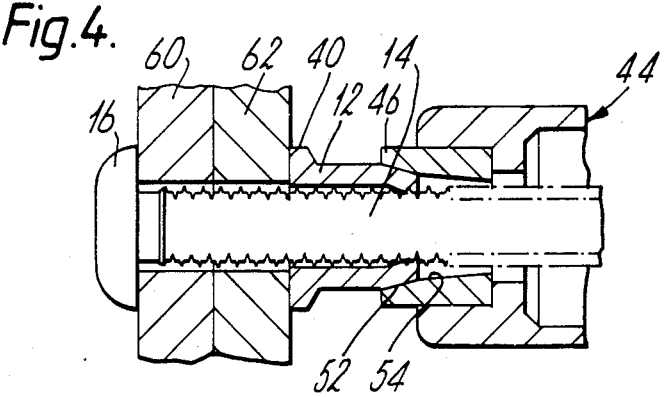
FIGS. 4, 5 and 6 are a sequence of views, similar to FIG. 1, but illustrating the installation sequence from initial swaging to completion of swaging and pin break.

The tapered part 52 of the anvil throat then starts to be driven over the collar 12. This deforms the collar radially inwardly, so as to swage the collar into at least the radially outer parts of those of the combination grooves 22 which lie inside it. FIG. 4 illustrates an early stage in this process, where the end part of the collar 12 is being swaged into the first groove inside the end of the collar.

Figure 5:
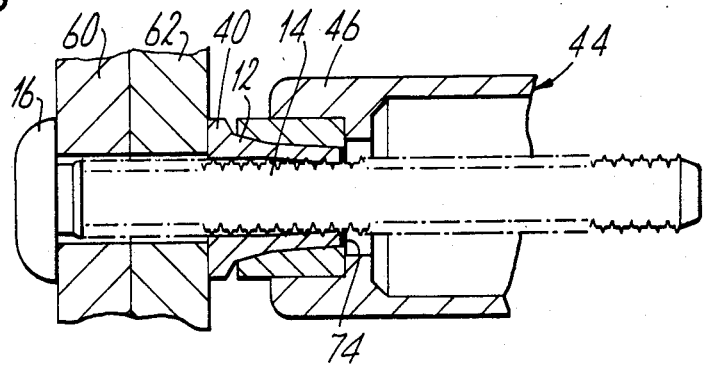

Further continued actuation of the placing tool causing the anvil 46 to be driven further over the collar, thereby swaging more of the length of the collar 12 into the radially outer part of successive combination grooves 22 on the pin. FIG. 5 illustrates the position where swaging is complete, and the collar cannot be deformed any further.

The collar has been swaged into the radially outer parts of these combination grooves to an extent which is not the same for all the grooves, but progressively decreases towards the collar flange 40 i.e away from the outer end of the collar. The forward movement of the anvil 46 with its tapered throat 50, progressively along the collar 12, has caused the collar to elongate slightly. Since the rear end of the collar is locked into the grooves on the pin, this has the effect of pressing the collar flange 40 forwards, so that the sheets 60 and 62 are squeezed between the pin head 16 and collar flange 40 when the collar is fully swaged with tension remaining in the pin. Additionally, it is possible for the collar to elongate slightly at its tail or free end. This is illustrated in FIG. 5, where the end 74 of the collar has moved slightly rearwardly across the groove in which it lay initially in FIG. 4. Since the collar cannot be deformed any more, increased tension on the pin, resulting from continued actuation of the pulling tool, causes the pin to break. It is found that this break occurs at that combination groove 22 on the pin which is at or adjacent the tail end 74 of the collar, thus giving the desirable so-called "flush-break" result. Since all the combination grooves have the same maximum depth, i.e. the diameter of each breakneck is the same, all breaknecks should have the same strength. Breaking is believed to occur at that groove which has the maximum additional tension applied across it by virtue of material from the swaged collar wedging apart the two ribs which lie on each side of the groove. This additional tension will be greatest at the tailmost groove at which the swaged collar material substantially fully enters the outermost groove part to provide such a wedging effect. Considering two adjacent grooves 22 into which the collar is swaged to a similar or substantially similar extent, the resultant axial force on that rib which is between the grooves will be very low due to the two wedging forces being substantially similar. However, adjacent the outer end of the fully swaged collar, there will be one annular rib on which the axial force is substantially unbalanced. The resultant axial force will be in the direction towards the tail end of the pin, due to the absence, or relatively small extent, of collar material swaged into the groove on the tailward side of the rib, compared with that swaged into the groove on the other side of the rib i.e. on the side towards the pin head. Consequently, it is believed, the additional axial tension is greatest across that groove which is on the side of the aforesaid rib towards the head, and the pin breaks at that breakneck.

Figure 6:
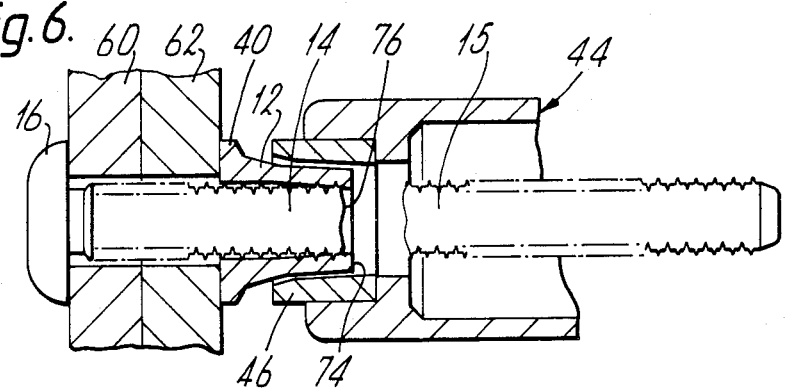

FIG. 6 illustrates the position immediately after breaking, with the tailmost part 15 of the pin separated from the remainder, and the anvil 46 freed from the fully swaged collar. The pin has broken at the groove just inside the outer end 74 of the swaged collar, leaving a broken surface 76.

Depending upon the precise relationship, in the direction along the pin, of the tail end 74 of the fully swaged collar in relation to the combination groove at which it is located, the break may occur just below, level with, or just outside, the tail end of the fully swaged collar.

FIGS. 8, 9, 10 and 11 illustrate possible alternative forms of cross-section of the combination groove.

Figure 8:
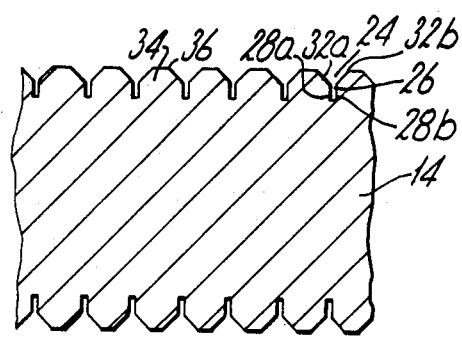
FIGS. 8 to 11 are similar to FIG. 2, but illustrate various possible alternative shapes of groove.

In FIG. 8, the radially inner part 26 of the groove has substantially parallel sidewalls 28a, 28b substantially in radial planes through the pin, so that this part of the groove is of substantially constant thickness. The radially outer part 24 has two sidewalls 32a, 32b which are inclined outwardly to each other and to a radial plane through the pin, and each rib 34 has a flat tip 36. In this example the discontinuity between the inner and outer sidewalls is one of direction, since there is a abrupt change of inclination between the adjacent sidewalls of the radially inner part and radially outer part, but not of displacement. There is a similar discontinuity between the opposite walls 28b, 32b.

Figure 9:
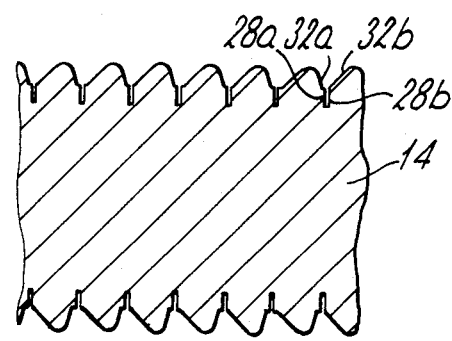

FIG. 9 shows a groove in which the junction between each outer wall 32a, 32b and the adjacent radially inner wall 28a, 28b at their mutual junction, takes the form of a relatively small displacement together with a change of inclination, i.e. a combination of the features of the grooves illustrated in FIG. 2 and FIG. 8 respectively. In FIG. 9, the side wall 32a, which is on the side of the groove nearer the pin head (the left, as shown in FIG. 9) slopes at a greater angle to the length of the pin then does the sidewall 32b which is on the side of the groove further away from the pin head.

Figure 10:
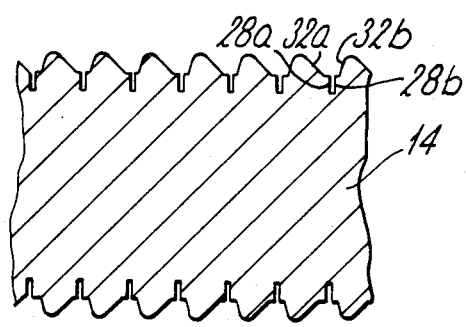

In FIG. 10, the arrangement is similar, but the shape of the groove is reversed, so that the degrees of slope of sidewalls 32a, 32b are interchanged.

Figure 11:
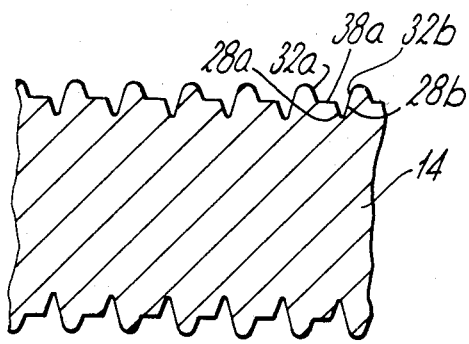

FIG. 11 illustrates a further possible groove shape. This is somewhat similar to that shown in FIG. 2, the sidewalls 28a and 32a having a displacement discontinuity at their junction, provided by the shoulder 38a. However, the opposite sidewalls 28b, 32b have no discontinuity between them, neither of displacement nor of inclination.

Figure 7:
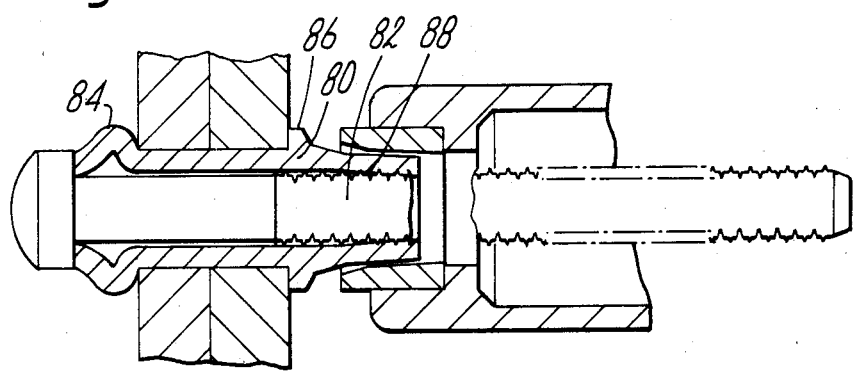
FIG. 7 is a view corresponding to FIG. 6 but illustrating the application of the invention to different variety of fastener.

FIG. 7 illustrates an embodiment of the invention in the form of a blind fastener of the second variety previously mentioned. Here the tubular member is provided by the shell 80 of a blind rivet, the pin 82 being pulled into the shell to deform the shell to form a blind head 84. The outer end of the shell has a preformed head 86, part of which is swaged into grooves 88 on the pin in order to lock the pin to the shell. The grooves may be of any of the forms illustrated hereinbefore.

One advantage of the combination groove forms described and illustrated above is that they enable the maximum depth of the groove at its radially innermost part to be selected at a desired value, without necessarily altering the shape of the radially outer part of the groove. This means that, within certain limits, the depth of the breaker grooves, and consequently the breakneck diameter and hence the pin breaking tension, may be selected at a desired value whilst leaving the shape of the radially outer part of the groove, and in particular the spacing between its sidewalls, the angle of slope of each sidewall and the pitch between adjacent grooves, at the optimum arrangement for receiving and engaging the swaged-in collar and/or for receiving and engaging the teeth of the pulling tool jaws. With the prior art form of combination grooves, which to the best of the knowledge and belief of the applicants have all been of V-section (whether symmetrical or asymmetrical) or serpentine shape (i.e. approximately sinusoidal), and without any discontinuity in the sidewall of the groove cross-section, alteration of the maximum groove depth also involves alteration of the shape of that part of the groove which is engaged by the swaged-in collar and/or pulling tool jaw theeth. Furthermore, with such prior art grooves the limitations of the rolling process (which is similar to the well known "thread rolling" process except that annular grooves instead of screw threads are formed) have required that the selected depth of the groove and the selected pitch of the groove could not be varied, in relationship to each other, outside a certain restricted range. The groove forms illustrated in the accompanying drawings allow this restriction to be substantially reduced, and the permissible range to be increased.

In the example pin described above with reference to FIG. 1, all the grooves throughout the length of the pin are identical combination lock, break and pull grooves. This gives the largest grip range (i.e. range of total thickness of workpiece which a particular design and size of fastener can satifactorily join), since the placing tool jaws are not restricted as to how far towards the pin head they can engage the grooves (i.e. unrestricted minimum grip), subject only to the minimum practical sheet thickness and minimum practical collar length. At the same time the position of the groove at which break occurs is unrestricted in the direction away from the pin head (i.e. unrestricted maximum grip), subject only to the number of grooves taken up by the placing tool. These two reservations mean that a certain number of grooves nearest the pin head, and a certain member of grooves nearest the pin tail end, need not necessarily be capable of functioning as breakneck grooves. However, it is believed that it is easier to manufacture the pin grooves by a rolling process if all of the grooves to be rolled in the pin are identical in cross-section.

The invention is not restricted to the details of the foregoing examples. For instance, the pin and collar need not be of steel but could be of any other suitable material, e.g. aluminium alloy.

We claim:

1. A pin and swaged tubular member fastener comprising:
   a pin having an elongate shank and a radially enlarged head at one end thereof;
   a plurality of annular locking grooves extending along the length of said shank, at least some of said locking grooves comprising combination locking and breakneck grooves, each of said combination grooves comprising:
   (a) a radially inner part having a bottom and two sidewalls extending radially inward over at least a portion of the length thereof,
   (b) a radially outer part comprising two sidewalls spaced axially apart and so defining a space, and
   (c) a discontinuity between a radially outer edge of at least one of said sidewalls of said radially inner part and a radially inner edge of an adjacent sidewall of said radially outer part, whereby a shape of said radially outer part may be independent of a shape of said radially inner part; and
   a tubular member fittable on said shank, whereby said tubular member may be swaged into said space of at least one of said combination grooves.

2. A fastener as claimed in claim 1, wherein said discontinuity comprises a displacement, in a direction across the width of the groove and along the length of the pin, between the radially outer edge of the sidewall of the radially inner part and the radially inner edge of the adjacent sidewall of the radially outer part.

3. A pin as claimed in claim 1, wherein said discontinuity comprises a difference between the inclination of the sidewall of the radially inner part and the inclination of the adjacent sidewall of the radially outer part at the junction between the two sidewalls.

4. A pin as claimed in claim 1, wherein said discontinuity comprises a combination of a displacement, in a direction across the width of the groove and along the length of the pin, between the radially outer edge of the sidewall of the radially inner part and the radially inner edge of the adjacent sidewall of the radially outer part, together with a difference between the inclination of the sidewall of the radially inner part and the inclination of the adjacent sidewall of the radially outer part.

5. A pin as claimed in any one of claims 2, 3, 4 or 1, in which there is a discontinuity between the radially outer edge of each of the sidewalls of the radially inner part and the radially inner edge of the adjacent sidewall of the radially outer part.

6. A pin as claimed in any one of claims, 2, 3, 4 or 1 wherein all of the plurality of locking grooves comprise combination locking and breakneck grooves.

7. A pin as claimed in any one of claims, 2, 3 4 or 1 wherein said combination locking and breakneck grooves are provided over a zone which extends along the pin towards an end thereof opposite said one end and which, in use, is gripped and pulled, thereby also to provide pulling grooves by means of which the pin may be gripped and pulled.

* * * * *